United States Patent
Huang et al.

(10) Patent No.: US 8,461,257 B2
(45) Date of Patent: Jun. 11, 2013

(54) WHITE POLYMIDE FILM AND MANUFACTURE THEREOF

(75) Inventors: Sheng-Yu Huang, Hsinchu Hsien (TW); Chung-Yi Chen, Hsinchu Hsien (TW)

(73) Assignee: Taimide Technology Incorporation, Hsinchu Hsien (TW)

( * ) Notice: Subject to any disclaimer, the term of this patent is extended or adjusted under 35 U.S.C. 154(b) by 0 days.

(21) Appl. No.: 13/599,550

(22) Filed: Aug. 30, 2012

(65) Prior Publication Data

US 2013/0032970 A1    Feb. 7, 2013

Related U.S. Application Data

(62) Division of application No. 12/906,951, filed on Oct. 18, 2010, now Pat. No. 8,288,471.

(51) Int. Cl.
*C08L 79/08*    (2006.01)

(52) U.S. Cl.
USPC ........... 524/600; 524/401; 524/404; 524/423; 524/425; 524/428; 524/430; 524/445; 524/612

(58) Field of Classification Search
USPC ........................ 523/307; 524/401, 600, 612
See application file for complete search history.

(56) References Cited

U.S. PATENT DOCUMENTS

2011/0220178 A1 *  9/2011  Kourtakis et al. ............. 136/249

FOREIGN PATENT DOCUMENTS

JP    2008168439 A  *  7/2008

OTHER PUBLICATIONS

Machine translation of JP 2008168439 A, Jul. 2008.*

* cited by examiner

*Primary Examiner* — Ling Choi
*Assistant Examiner* — Wenwen Cai
(74) *Attorney, Agent, or Firm* — Baker & McKenzie LLP

(57) ABSTRACT

A process of manufacturing a white polyimide film comprising performing condensation polymerization of monomers comprising diamine and dianhydride components to obtain a solution; adding a dehydrant, a catalyst and a coloration filler into the solution to obtain a precursor solution; coating a layer of the precursor solution on a support; and baking the coated layer of the precursor solution to form a white polyimide film. The diamine component can include 2,2'-bis(trifluoromethyl) benzidine, and the dianhydride component can include 3,3', 4,4'-biphenyltetracarboxylic dianhydride and 2,2-bis[4-(3,4-dicarboxyphenoxy)phenyl]propane dianhydride. The coloration filler can include $TiO_2$, $Al_2O_3$, $CaCO_3$, $CaSO_4$, $SiO_2$, BN, AlN and clay.

16 Claims, 1 Drawing Sheet

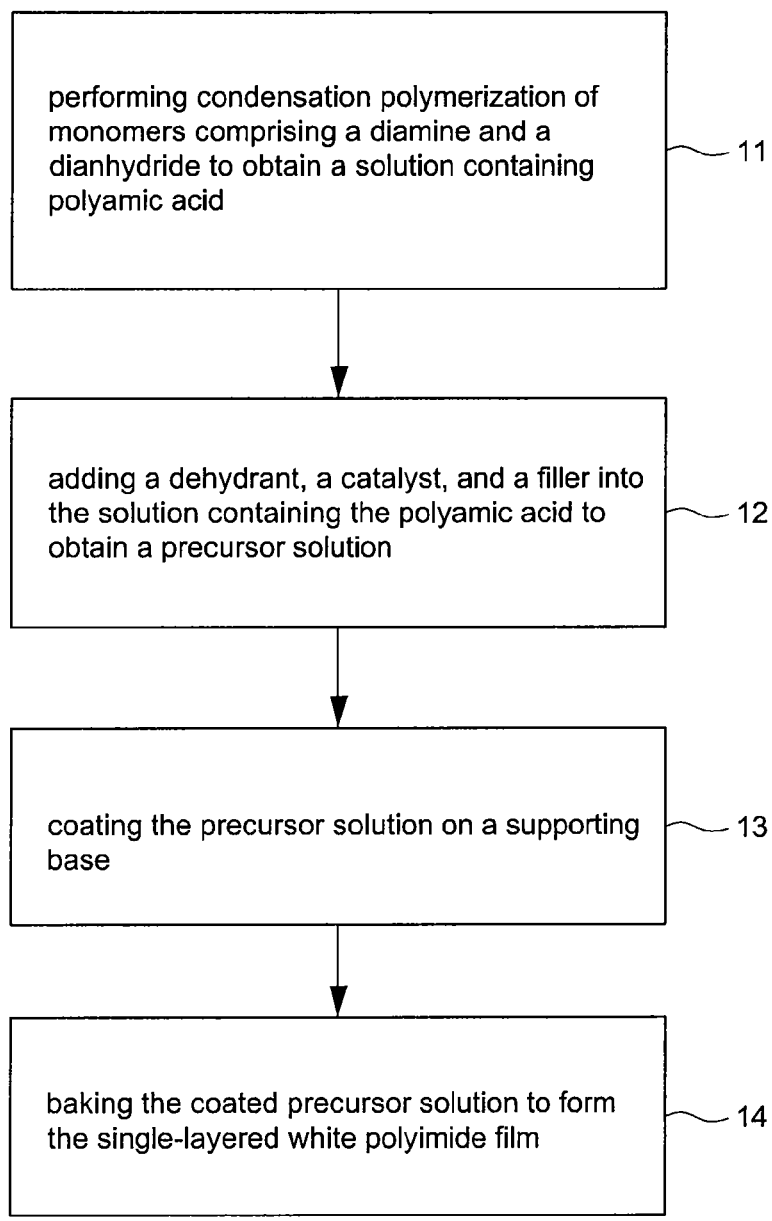

WHITE POLYMIDE FILM AND MANUFACTURE THEREOF

CROSS-REFERENCE TO RELATED APPLICATION

This application is a divisional application of U.S. patent application Ser. No. 12/906,951 filed on Oct. 18, 2010.

BACKGROUND OF THE INVENTION

The present invention relates to the manufacture of polyimide films, and more particularly to color polyimide films such as white polyimide.

Polyimide (PI) films are lightweight, flexible, and exhibit excellent mechanical properties as well as good resistance to heat and chemicals. Therefore, PI films are widely used in the electronics industry, such as in the fabrication of light-emitting diode (LED) devices, liquid crystal display devices, and the like. However, as the electronic industry advances, more demands are put on the quality and characteristics of PI films. In particular, certain design requirements may impose specific film coloration, e.g., opaque white, which is different from the conventional orange/yellow color characteristic of the PI film.

To form a white polyimide film, one known approach consists of coating a white resin (e.g., epoxy resin, acrylic resin or polydimethylsiloxane resin) on the conventional polyimide film for forming a dual-layered polyimide film. While this approach can form a polyimide film with the desired white tint, coating additional resin usually increases the manufacture cost and adversely affects film properties. In particular, because the resin coating generally has poor thermal resistance, color deterioration or yellowing can be usually observed when the PI film is exposed to thermal stress.

Another known approach consists of incorporating a white filler during the process of forming the polyimide film. In this manner, a polyimide film can be formed with the desired white color without the need of additional resin coating. This alternative approach typically adopts a "one-step method," i.e., the condensation polymerization and ring-closing reaction of diamine monomers and dianhydride monomers are completed in one reactor, and a solution containing polyimide is directly obtained. The solvent of the polyimide solution can be then removed to obtain a solid polyimide film. Unfortunately, white polyimide films formed with this method still have insufficient resistance to chemicals and do not meet the design requirements for LED manufacture.

Therefore, there is a need for a white polyimide film that can have enhanced properties and can be manufactured in a cost-effective manner.

BRIEF SUMMARY OF THE INVENTION

The present application describes a white polyimide film and its manufacture method. The white polyimide film can be prepared by reacting a diamine component with a dianhydride component. More particularly, one embodiment of the white polyimide film can comprise a polyimide base polymer that has a combination of molecular structures represented by the following formulae (I) and (II):

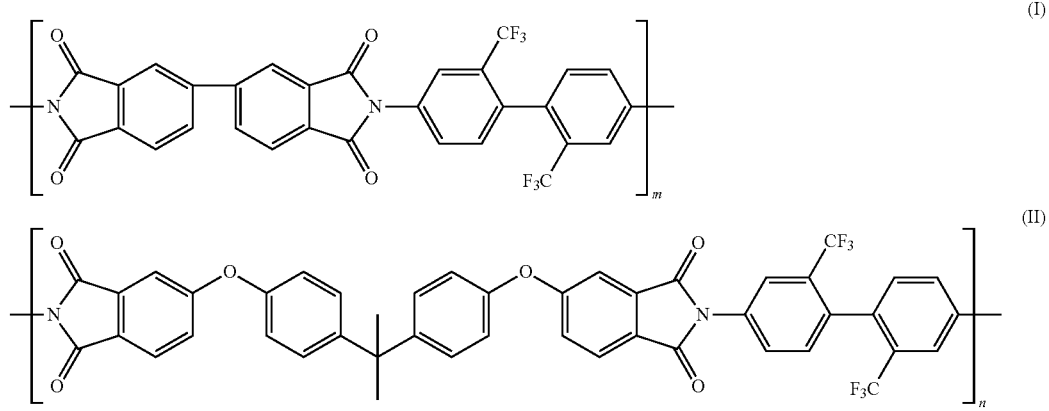

wherein the m:n ratio representing the molar ratio of the molar structure (I) and (II) in the polyimide base polymer is about 0.95-0.05:0.05-0.95; and a coloration filler homogeneously distributed in the white polyimide film.

The present application also provides a white polyimide film comprising: a polyimide base polymer and a coloration filler, wherein the white polyimide film has a coefficient of thermal expansion (CTE) less than about 60 ppm/° C. in a temperature range between about 100° C. and about 200° C., an elongation rate between about 5% and about 60%, an L*-value more than about 90, and a b*-value between about 0 and about 15.

In other embodiments, the present application also provides a process of manufacturing a white polyimide film, comprising performing condensation polymerization of monomers comprising diamine and dianhydride components to obtain a polyamic acid solution, adding a dehydrant, a catalyst and a coloration filler into the polyamic acid solution to obtain a precursor solution, coating a layer of the precursor solution on a supporting base, and baking the coated layer to form a white polyimide film.

BRIEF DESCRIPTION OF THE DRAWINGS

FIG. 1 is a flowchart illustrating method steps for forming a white polyimide film.

DETAILED DESCRIPTION OF THE INVENTION

The present application provides a white polyimide film with enhanced properties and its method of manufacture. The polyimide film is formed as a single white-colored layer, comprising:

a polyimide base polymer obtained by reacting a diamine component with a dianhydride component, the polyimide base polymer consisting of a combination of molecular structures represented by the following formulae (I) and (II):

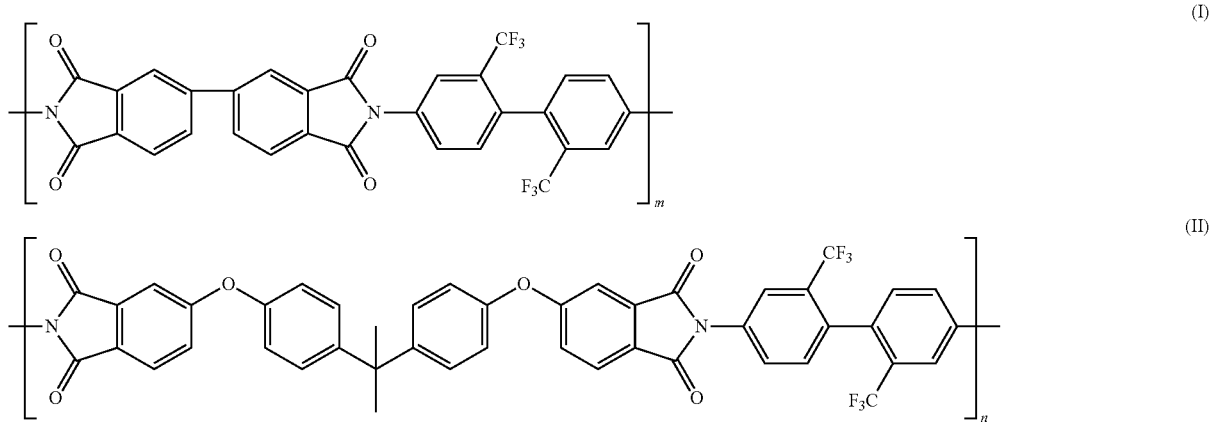

wherein the m:n ratio representing the molar ratio of the molar structure (I) and (II) in the polyimide base polymer is about 0.95-0.05:0.05-0.95; and a coloration filler homogeneously distributed in the polyimide film.

The m:n ratio can be between about 0.95-0.05:0.05-0.95, such as between about 0.85-0.20:0.15-0.80, for example 0.80-0.40:0.20-0.60. Stated another way, the polyimide base can comprise about 95 mol % to about 5 mol % of molar structure (I) (m) and about 5 mol % to about 95 mol % of molar structure (II) (n), such as about 85 mol % to about 15 mol % of m and about 20 mol % to 80 mol % of n, for example about 80 mol % to about 20 mol % of m and about 40 mol % to about 60 mol % of n.

In one embodiment, examples of suitable diamine components can include 2,2'-bis(trifluoromethyl)benzidine (TFMB) represented by the following formula:

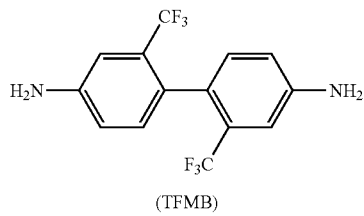 [SMILES: Nc1ccc(-c2ccc(N)cc2C(F)(F)F)c(C(F)(F)F)c1]

(TFMB)

Examples of suitable dianhydride components can be selected from the group consisting of 3,3',4,4'-biphenyltetracarboxylic dianhydride (BPDA) and 2,2-bis[4-(3,4-dicarboxyphenoxy)phenyl]propane dianhydride (BPADA), respectively represented by the following formulae:

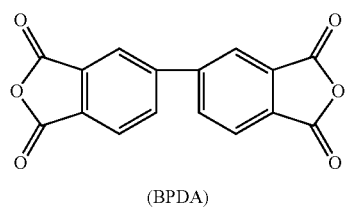

(BPDA)

-continued

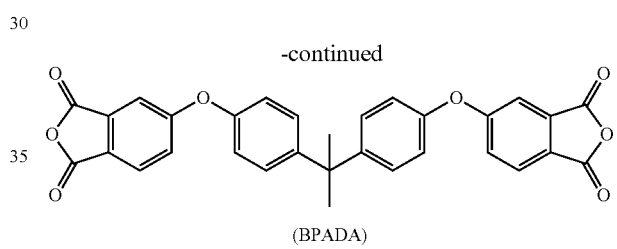

(BPADA)

In the white polyimide film, the coloration filler is homogeneously mixed with the polyimide base polymer. The coloration filler can be selected from the group consisting of titanium dioxide ($TiO_2$), zirconium oxide ($ZrO_2$), calcium oxide (CaO), zinc oxide ($ZnO_2$), aluminum oxide ($Al_2O_3$), zinc sulfide ($ZnS_2$), calcium carbonate ($CaCO_3$), lead carbonate ($PbCO_3$), lead hydroxide ($Pb(OH)_2$), calcium sulfate ($CaSO_4$), barium sulfate ($BaSO_4$), silicon dioxide ($SiO_2$), boron nitride (BN), aluminum nitride (AlN), basic zinc molybdate, basic calcium zinc molybdate, lead white, molybdenum white, lithopone (a mixture of barium sulfate and zinc sulfide), and clay.

In some embodiments, the coloration filler is selected from the group consisting of $TiO_2$, $Al_2O_3$, $CaCO_3$, $CaSO_4$, $SiO_2$, BN, AlN and clay. In one embodiment, the coloration filler is $TiO_2$, such as rutile $TiO_2$, anatase $TiO_2$, or brookite $TiO_2$.

The weight ratio for the filler can be between about 5% and about 70% of the total weight of the polyimide material, such as between about 10% and about 50%, for example between about 15% and about 30%.

In some embodiments, the white polyimide film can further comprise a pigment additive exhibiting complementary color to the polyimide base polymer and filler. The pigment additive can be a heat resistant blue pigment including, without limitation, organic blue pigments and inorganic blue pigments. In one embodiment, the pigment can be cyanine blue, ultramarine blue, or both. The weight ratio of the blue pigment additive can be between about 0% and about 20% of the total weight of the polyimide (PI) material, such as between about 0% and about 10%, for example between about 0% and about 5%.

The white polyimide film is synthesized by a condensation polymerization reaction involving the reaction of a diamine monomer with a dianhydride monomer. The molar ratio of the dianhydride to diamine monomers is approximately 1:1, for example about 0.90:1.10 or 0.98:1.02.

In step 11 of FIG. 1, monomers comprising diamine and dianhydride components are first reacted together in solvent during a condensation polymerization to obtain a polyamic acid solution. Diamine components can comprise TFMB, and dianhydride components can comprise BPDA and BPADA. The solvent can be a non-protonic polar solvent. For economic considerations and easy operation, the solvent can have a relatively low boiling point (e.g., below about 225° C.), so that the solvent can be removed from the polyimide film at a relatively low temperature.

Examples of suitable solvents can include, without limitation, dimethylacetamide (DMAC), diethylacetamide, N,N'-dimethylformamide (DMF), N,N'-diethylformamide, N-methylpyrrolidone (NMP), dimethyl sulfoxide (DMSO), tetramethylsulfone N,N'-dimethyl-N,N'-propylene urea (DMPU), tetramethyl urea (TMU), N-methylcarpolactam, hexamethylphosphoramide, m-cresol, phenol, p-chlorophenol, 2-chloro-4-hydroxytoluene, diglyme, triglyme, tetraglyme, dioxane, dioxolane, cyclohexanone, cylcopentanone, and butyrolactone, and any combination thereof. In one embodiment, the solvent is DMAC.

In step 12 of FIG. 1, a dehydrant, a catalyst and a coloration filler can be then incorporated into the polyamic acid solution which is agitated to obtain a homogeneous precursor solution. Examples of the coloration filler can include $TiO_2$, $Al_2O_3$, $CaCO_3$, $CaSO_4$, $SiO_2$, BN, AlN and clay and the like. The weight ratio for the coloration filler can be between about 5% and about 70% per PI total weight. The dehydrant can be selected from aliphatic acid anhydrides, such as acetic anhydride and propionic anhydride, and aromatic acid anhydrides, such as benzoic anhydride and phthalic anhydride, used alone or in combination. In one embodiment, the dehydrant is acetic anhydride, and the used amount is between about 2 and about 3 moles per equivalent of the polyamic acid.

The catalyst can be selected from heterocyclic tertiary amines, such as picoline, pyridine, lutidine, isoquinoline, quinoline, cinnoline, quinozaline, phthalazine, quinzoline, imidazole, N-methylpyrolidone, N-ethylpyrrolidone, N-methylpiperidine, N-ethylpiperidine, and the like, aliphatic tertiary amines, such as triethylamine (TEA), tripropylamine, tributylamine, triethanolamine, N,N-dimethylethanolamine, N,N-dimethylethanolamine, triethylenediamine, and diisopropylethylamine (DIPEA), and aromatic tertiary amines, such as dimethylaniline, used alone or in combination.

In one embodiment, the catalyst is picoline, such as α-picoline, β-picoline, or γ-picoline. The polyamic acid:dehydrant:catalyst molar ratio can be about 1:2:1, wherein for every mole of polyamic acid, there are about 2 moles of dehydrant and about 1 mole of catalyst.

In step 13 of FIG. 1, a layer of the precursor solution is coated on a glass or stainless steel plate support.

In step 14 of FIG. 1, the coated layer is baked to form a white polyimide film, which can be then peeled from the plate support. A suitable temperature range for baking is between about 90° C. and about 350° C. The white polyimide film thereby formed includes a coloration filler that is homogeneously distributed in the polyimide base polymer of the white polyimide film.

In some embodiments, step 12 can further comprise incorporating a pigment additive presenting complementary color to the color of the polyimide and the coloration filler into the polyamic acid solution. The pigment additive can include a heat-resistant blue pigment additive. Suitable blue pigment additives can include, without limitation, organic blue pigments and inorganic blue pigments. More specifically, a blue pigment can be cyanine blue, ultramarine blue and combinations thereof, and the used amount can be between 0 wt % to about 20 wt % per PI total weight.

Other additives can also be incorporated into the solution containing polyamic acid in step 12 to confer desired properties to the polyimide film. For example, suitable additives can include, without limitation, processing aid, antioxidant, light stabilizer, light extinction coefficient modifier, flame retardant additive, anti-static agent, heat stabilizer, ultraviolet light absorbing agent and reinforcing agent, which can be used alone or in combination.

The white polyimide film formed can have a thickness between about 5 μm and about 150 μm, such as between about 5 μm and about 75 μm, for example between about 10 μm and about 50 μm.

An advantage of the white polyimide film described herein is its enhanced mechanical properties and resistance to heat. The white polyimide film has a coefficient of thermal expansion (CTE) much less than 60 ppm/° C. in a temperature range between about 100° C. and about 200° C. In particular, it is observed that the CTE of the white polyimide film can exhibit enhanced resistance to heat with a CTE lower than 45 ppm/° C., such as 30 ppm/° C., more specifically even lower than 25 ppm/° C. Moreover, the formed white polyimide film has an elongation rate between about 5% and about 60%, more particularly within a range between about 5% and about 30%.

In addition to the above properties, the formed white polyimide film also exhibits desirable color with a L*-value more than about 90, and with a b*-value between about 0 and about 15, in particular between about 1 and about 10, and as low as between about 1 and about 5. The L*-value and the b*-value are indexes defined in the conventional "Lab color space". The L*-value represents color lightness and the b*-value characterizes the color dimension between yellow and blue.

In the white polyimide described herein, the color characteristics remain relatively stable, even when the white polyimide film is subjected to heat (e.g., when it is baked), with a variation Δb* of the b*-value that is less than about 5 within a temperature range between 250° C. and 320° C., typical baking conditions. The variation Δb* of the b*-value is more particularly between about 0.1 and about 1. The white polyimide described herein also provides the advantage of a total transparency (TT) value that is less than about 40%, such as less than 30%, for example less than 20%, less than 10%, or less than 5%.

Further, for comparison, a film merely composed of the polyimide components represented by the formula (I) and the formula (II) without filler has a b* value between about 1 and about 20.

Example 1

Polymerization: Under ambient temperature, nitrogen gas is fed into a 500 ml three-necked flask polymerization vessel. All reactions are performed under a nitrogen environment. About 160 g of dimethylacetamide (DMAC) used as solvent is added into the flask. About 18.77 g (0.059 mole) of 2,2'-bis(trifluoromethyl)benzidine (TMFB) are dissolved into the DMAC. After the TMFB is completely dissolved in the DMAC, about 13.35 g (0.045 moles) of biphenyl tetracarboxylic dianhydride (BPDA) and about 7.87 g (0.015 moles) of 2,2-bis[4-(dicarboxyphenoxy)phenyl]propane dianhydride (BPADA) are added into the solution, which is continuously agitated for about 4 hours. A polyamic acid (PAA) solution is formed with a viscosity of about 150,000 centipoise (cP).

Making Film: The PAA composition is mixed with a dehydrant acetic anhydride, a catalyst picoline, and $TiO_2$ as white filler to obtain a precursor solution. The PAA:acetic anhydride:picoline molar ratio is about 1:2:1. The white filler is incorporated in a ratio of about 3.6 g of $TiO_2$ for about 60 g of the PAA solution. The precursor solution is agitated for about 2 hours to homogeneously distribute the white filler into the PAA solution. Then, a layer of the precursor solution is coated onto a glass plate support by using a coating blade. The coated layer, having a thickness of about 1 mil (25 μm), is baked in a furnace in a stepwise manner at about 100° C. for 30 minutes, then about 200° C. for 30 minutes, and subsequently about 300° C. for 30 minutes. A white polyimide film thereby formed having a $TiO_2$/PI weight percentage of about 30% can be peeled from the plate support.

Example 2

A polyimide film is prepared as in Example 1 except that the PAA solution is mixed with $TiO_2$ as filler and a blue pigment additive in a ratio of about 2.4 g of $TiO_2$ and about 0.6 g of the blue pigment additive for about 60 g of the PAA solution, and then agitated for about 2 hours for homogeneously distributing the filler and blue pigment additive in the PAA solution. The composition including the PAA, filler and blue pigment additive is then casted on a plate support and baked in the same manner as Example 1 for obtaining a white polyimide film. The polyimide film thereby formed has $TiO_2$/PI and blue pigment/PI weight percentages of about 20% and about 5%, respectively.

Example 3

A polyimide film is prepared as in Example 1 except that the PAA solution, filler and blue pigment additive are mixed in a ratio of about 3.6 g of $TiO_2$ and about 0.6 g of blue pigment additive for about 60 g of the PAA solution, and then agitated for about 2 hours to homogeneously distribute the filler and blue pigment additive into the PAA solution. The composition including the PAA, filler and blue pigment is casted on a plate support and baked in the same manner as Example 1 to obtain a white polyimide film. The polyimide film thereby formed has $TiO_2$/PI and blue pigment/PI weight percentages of about 30% and about 5%, respectively.

Comparative Example 1

Under ambient temperature, nitrogen gas is fed into a 500 ml three-necked flask polymerization vessel. All reactions are performed under a nitrogen environment. About 160 g of DMAC used as solvent is added into the flask. About 18.77 g (0.059 mole) of TMFB are dissolved into the DMAC. After the TMFB is completely dissolved in the DMAC solvent, about 13.35 g (0.045 moles) of BPDA and about 7.87 g (0.015 moles) of BPADA are added into the liquid solution, which is then continuously agitated for about 4 hours for forming a PAA solution with a viscosity of about 150,000 cP. The PAA solution is mixed with a dehydrant acetic anhydride and a catalyst picoline with a PAA:acetic anhydride:picoline molar ratio of about 1:2:1 to obtain a precursor solution. A polyimide film is casted in the same manner as Example 1.

Comparative Example 2

A white polyimide film is formed by mixing a conventional polyimide component with a white filler. More specifically, under ambient temperature, nitrogen gas can be fed into a 500 ml three-necked flask polymerization vessel. All reactions are performed under a nitrogen environment. About 160 g of DMAC, used solvent during the polymerization, is added into the flask. About 19.14 g (0.096 moles) of 4,4'-oxydianiline (4,4'-ODA) are added into the flask. After the 4,4'-ODA is completely dissolved in the DMAC, about 20.86 g (0.096 moles) of pyromellitic dianhydride (PMDA) are incorporated into the solvent solution. This solution is then continuously agitated for about 4 hours for obtaining a PAA solution having a viscosity of about 150,000 cP. A $TiO_2$ white filler is mixed with the PAA solution in a ratio of about 3.6 g of $TiO_2$ for about 60 g of the PAA solution. Finally, a polyimide film is casted in the same manner as Example 1.

Polyimide films formed according to Examples 1, 2, 3 and Comparative Examples 1 and 2 are respectively subjected to various tests for determining certain mechanical properties, color properties of the polyimide films. The results of these tests are shown in the following Tables 1 and 2.

TABLE 1

| Mechanical properties and CTE. | | | | | |
|---|---|---|---|---|---|
| Item | $TiO_2$/PI (wt %) | Blue pigment/ PI (wt %) | Modulus (Kgf/mm$^2$) | Elongation (%) | CTE (100–200° C.) (ppm/° C.) |
| Example 1 | 30 | 0 | 552 | 10.5 | 22.6 |
| Example 2 | 20 | 5 | 548 | 11.3 | 22.5 |
| Example 3 | 30 | 5 | 575 | 8 | 22.3 |
| Comparative Example 1 | 0 | 0 | 457 | 14.3 | 24 |
| Comparative Example 2 | 30 | 0 | 352 | 60 | 28 |

Table 1 shows the Young's modulus (expressed in Kgf/mm$^2$), elongation rate and CTE (expressed in %) of the polyimide film. The mechanical elongation rate was measured according to the ASTM 882 standard test by using a universal tensile strength tester. The CTE was measured by using a thermal mechanical analyzer TMA 2940 (sold by TA Instruments, Inc.). The film expansion was measured by applying a standard load force (e.g., about 0.05 N) under a thermal stress varying from about 100° C. to about 200° C., with a ramping rate of about 10° C./min. As shown in Table 1, white polyimide films obtained with Examples 1 through 3 have better mechanical properties in high temperature environment, characterized by relatively lower CTE values.

TABLE 2

Colorimetric properties.

| Item | TiO$_2$/PI (wt %) | Blue pigment/PI (wt %) | Colorimetric test L* | b* |
|---|---|---|---|---|
| Example 1 | 30 | 0 | 92.4 | 3.1 |
| Example 2 | 20 | 5 | 92.7 | 2.4 |
| Example 3 | 30 | 5 | 93.3 | 1.9 |
| Comparative Example 1 | 0 | 0 | 88.2 | 4.6 |
| Comparative Example 2 | 30 | 0 | 87 | 47.8 |

Table 2 shows color characteristics of the polyimide films measured by using a spectral colorimeter at a temperature of about 25° C. The color characteristics are expressed in the "Lab color space", wherein the L*-value characterizes the color lightness, and the b*-value characterizes a color dimension from blue to yellow. White polyimide films obtained with Examples 1, 2 and 3 have a b*-value that is lower than a polyimide film obtained with Comparative Examples 1 and 2. This test shows that the white polyimide films formed according to Examples 1, 2 and 3 exhibit lower yellowing coloration. Moreover, the polyimide films obtained with Examples 1, 2 and 3 have L*-values that are higher than those of Comparative Example 1 and 2, which indicate higher white tint.

In the fabrication of LED or LCD devices, the polyimide film is typically subject to a baking step to achieve adhesion of the polyimide film. For illustrating stable color characteristics of the polyimide film described herein, Table 3 illustrates how the b*-value of the polyimide film obtained with Example 3 may vary under different baking temperatures.

TABLE 3

Variation of b*-value for Example 3

| Item | Baking condition | b* | Δb* |
|---|---|---|---|
| Example 3 | 250° C./30 min | 1.9 | — |
| | 280° C./30 min | 2.0 | 0.1 |
| | 300° C./30 min | 2.3 | 0.4 |
| | 320° C./30 min | 2.5 | 0.6 |

The polyimide film formed according to Example 3 has a relatively low variation of the b*-value when it undergoes baking As a result, the polyimide film described herein can have stable color characteristics under thermal stress.

Accordingly, advantages of the white polyimide films described herein include excellent mechanical properties, good resistance to heat, and stable chromaticity characteristic under thermal stress.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims and its equivalent systems and methods.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having" are inclusive and therefore specify the presence of stated features, integers, steps, operations, elements, components, groups, or combinations thereof, but do not preclude the presence or addition of one or more other features, integers, steps, operations, elements, components, or groups thereof. The method steps, processes, and operations described herein are not to be construed as necessarily requiring their performance in the particular order discussed or illustrated, unless specifically identified as an order of performance. It is also to be understood that additional or alternative steps may be employed.

We claim:

1. A process of manufacturing a white polyimide film, comprising:

performing condensation polymerization of monomers comprising diamine and dianhydride components to obtain a solution containing polyamic acid;

adding a dehydrant, a catalyst, a white coloration filler and a color pigment into the solution containing the polyamic acid to obtain a precursor solution, wherein the color pigment presents a color complementary to at least a natural color of a polyimide base polymer derived from the condensation polymerization of the diamine and dianhydride components; wherein the diamine component is 2,2'-bis(trifluoromethyl)benzidine (TFMB);

coating a layer of the precursor solution on a support; and baking the layer coated on the support to form a white polyimide film.

2. The process of claim 1, wherein the dianhydride components include 3,3',4,4'-biphenyltetracarboxylic dianhydride (BPDA) and 2,2-bis[4-(3,4-dicarboxyphenoxy)phenyl]propane dianhydride (BPADA).

3. The process of claim 1, wherein the white coloration filler is selected from the group consisting of TiO$_2$, ZrO2, Al$_2$O$_3$, CaO, ZnO2, ZnS2, CaCO$_3$, PbCO3, Pb(OH)2, CaSO$_4$, BaSO4, SiO$_2$, BN, AlN, basic zinc molybdate, basic calcium zinc molybdate, lead white, molybdenum white, lithopone and clay.

4. The process of claim 1, wherein the weight ratio for the white coloration filler is between about 5% and about 70% per polyimide total weight.

5. The process of claim 1, wherein the step of baking the layer coated on the support is performed at a temperature between about 90° C. and about 350° C.

6. The process of claim 1, wherein the white polyimide film has a thickness between about 5 μm and about 150 μm.

7. The process of claim 1, wherein the step of adding a dehydrant, a catalyst, a white coloration filler and a color pigment into the solution containing the polyamic acid is performed with a polyamic acid:dehydrant:catalyst molar ratio of about 1:2:1.

8. The process of claim 1, wherein the polyimide base polymer includes structures represented by the following formulae (I) and (II):

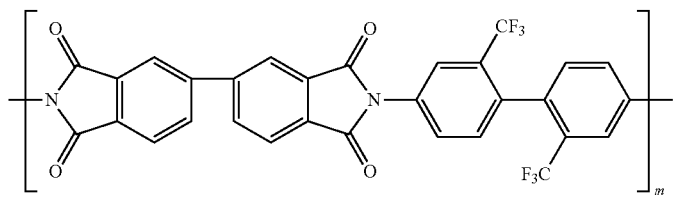

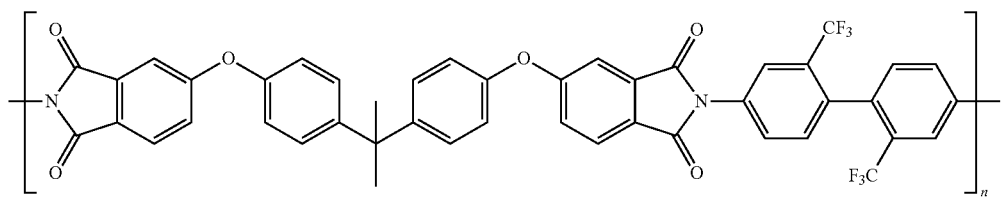

wherein the ratio of m:n is about 0.95-0.05:0.05-0.95.

9. A process of manufacturing a white polyimide film, comprising:
performing condensation polymerization of monomers to obtain a solution containing polyamic acid, wherein the monomers consist of 2,2'-bis(trifluoromethyl)benzidine (TFMB) as a diamine component, and 3,3',4,4'-biphenyltetracarboxylic dianhydride (BPDA) and 2,2-bis[4-(3,4-dicarboxyphenoxy)phenyl]propane dianhydride (BPADA) as dianhydride components;
adding a dehydrant, a catalyst, a coloration filler and a blue pigment into the solution containing the polyamic acid to obtain a precursor solution;
coating a layer of the precursor solution on a support; and
baking the layer coated on the support at a temperature between about 90° C. and about 350° C. to form a white polyimide film.

10. The process of claim 9, wherein the coloration filler is selected from the group consisting of $TiO_2$, ZrO2, $Al_2O_3$, CaO, ZnO2, ZnS2, $CaCO_3$, PbCO3, Pb(OH)2, $CaSO_4$, BaSO4, $SiO_2$, BN, AlN, basic zinc molybdate, basic calcium zinc molybdate, lead white, molybdenum white, lithopone and clay.

11. The process of claim 9, wherein the weight ratio for the coloration filler is between about 5% and about 70% per polyimide total weight.

12. The process of claim 9, wherein the white polyimide film has a thickness between about 5 μm and about 150 μm.

13. The process of claim 9, wherein the step of adding a dehydrant, a catalyst, and a coloration filler into the solution containing the polyamic acid is performed with a polyamic acid:dehydrant:catalyst molar ratio of about 1:2:1.

14. A process of manufacturing a white polyimide film, comprising:
performing condensation polymerization of monomers to obtain a solution containing polyamic acid, wherein the monomers include 2,2'-bis(trifluoromethyl)benzidine (TFMB) as a diamine component, and 3,3',4,4'-biphenyltetracarboxylic dianhydride (BPDA) and 2,2-bis[4-(3,4-dicarboxyphenoxy)phenyl]propane dianhydride (BPADA) as dianhydride components;
adding a dehydrant, a catalyst, a coloration filler, and a blue pigment into the solution to obtain a precursor solution;
coating a layer of the precursor solution on a support; and
baking the layer on the support to form a white polyimide film.

15. The process of claim 14, wherein the coloration filler is selected from the group consisting of $TiO_2$, ZrO2, $Al_2O_3$, CaO, ZnO2, ZnS2, $CaCO_3$, PbCO3, Pb(OH)2, $CaSO_4$, BaSO4, $SiO_2$, BN, AlN, basic zinc molybdate, basic calcium zinc molybdate, lead white, molybdenum white, lithopone and clay.

16. The process of claim 14, wherein the weight ratio for the coloration filler is between about 5% and about 70% per polyimide total weight.

* * * * *